Aug. 12, 1924.　　　　　　　　　　　　　　　　　　　1,504,220

H. DEGEN

MEANS FOR LOCKING AUTOMOBILES

Filed June 18, 1921

Inventor
Herman Degen.
By Morsell + Keeney,
Attorneys

Patented Aug. 12, 1924.

1,504,220

UNITED STATES PATENT OFFICE.

HERMAN DEGEN, OF MILWAUKEE, WISCONSIN.

MEANS FOR LOCKING AUTOMOBILES.

Application filed June 18, 1921. Serial No. 478,593.

*To all whom it may concern:*

Be it known that I, HERMAN DEGEN, a citizen of the United States, and resident of Milwaukee, in the county of Milwaukee and State of Wisconsin, have invented new and useful Improvements in Means for Locking Automobiles, of which the following is a description, reference being had to the accompanying drawings, which are a part of this specification.

This invention relates to improvements in means for locking automobiles and other vehicles, and particularly to a device for locking the wheels of the vehicle against rotation, and also for preventing steering of the vehicle.

One object of the invention is to provide a simple and inexpensive device for locking the wheels of an automobile, or the like, against rotation, so that the vehicle cannot be used by unauthorized persons, which device may be readily applied by a person unskilled in mechanics with the aid of ordinary tools.

A further object is to provide a device of this character which may be arranged to prevent the steering of the vehicle.

The invention consists in the novel constructions, combinations and arrangements to be hereinafter described and claimed for carrying out the above stated objects, and such other objects as will appear from the following description of certain preferred embodiments illustrated in the accompanying drawings, wherein—

Like characters of reference designate like parts in the several figures of the drawings.

Figure 1:
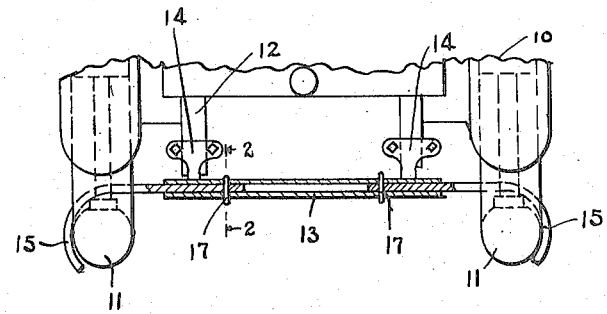
Fig. 1 is a fragmentary plan view, partly in section, showing one form of the device applied to an automobile.
Figure 2:
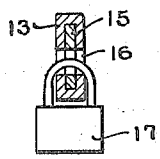
Fig. 2 is a section along the line 2—2 of Fig. 1, showing the lock.

The invention is illustrated as applied to an automobile 10 having front wheels 11 and frame members 12, to which a bumper is adapted to be attached. In the form shown in Fig. 1, in place of the usual bumper, a hollow bar 13 of rectangular cross-section is fixed by means of brackets 14 to the frame members 12. A pair of hook-shaped locking members 15 are adapted to be inserted within the hollow ends of the bar 13. The members 15 and the bar 13 are provided with openings 16 which are adapted to register when in the position shown in Figs. 1 and 2, and in this position a suitable lock 17 is adapted to be passed through the perforations 16 to lock the members 15 in rigid relation with respect to the bar 13. The members 15 project between the spokes of the wheels, and the hooked ends thereof extend partially around the tires. In this position they prevent both the rotation of the wheels and the steering thereof. To unlock the machine, the locks 17 are first removed, and then the members 15 removed.

Figure 3:
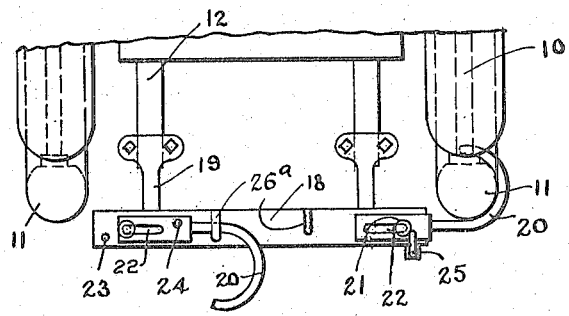
Fig. 3 is a view corresponding to that of Fig. 1, but showing a modified form of locking device.

In Fig. 3 is illustrated a modified form in which a fixed bar 18 is supported slightly forward of the wheels 11 by brackets 19 secured to the frame members 12. Hook-shaped locking members 20 are pivoted at 21 to the bar, and are also provided with a slot 22 by means of which they may be moved longitudinally of the pivot. The member 20 at the right-hand of Fig. 3 is shown as swung around the tire 11 with the end of the hook projecting between the spokes. In this position a perforation 23 in the bar and the perforation 24 in the member 20 are adapted to register so that a suitable lock 25 may be passed through these registering perforations and the member 20 locked rigidly with respect to the bar 18. For the purpose of illustration, the member 20 on the left-hand of the figure is shown as swung in unlocked position. In this position the member is adapted to engage a suitable projection 26$^a$ on the bar by means of which it is held in unlocked position. The slots 22 in the member 20 permit such slight amount of longitudinal movement of the member with respect to the bar 18 as is required to pass the ends of the hooks around the tire.

Figure 4:
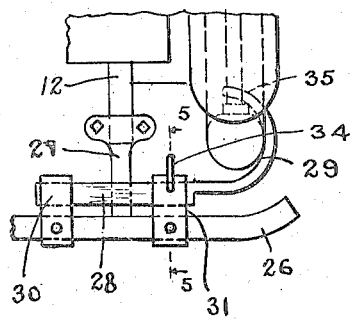
Fig. 4 is a fragmentary plan view showing another modification applied in connection with the front bumper of an automobile.

In Fig. 4 is illustrated another modification in which a locking device is applied to a vehicle having a bumper 26 secured by brackets 27 to the frame members 12, only one end of the bumper being shown in the view. The straight portion 28 of the hook-shaped locking member 29 is adapted to slide through a pair of brackets 30 and 31, surrounding the bumper 26 and bolted or otherwise secured thereto. These brackets are provided with rectangular-shaped openings 32 conforming in cross-section to that of the straight portion 28 and within which the latter slide. This portion of the bracket 31 is provided with an opening 33 adapted to register with a similar opening in the straight portion 28 of the locking member when the hooked end is brought into the position shown in Fig. 4. In this position a suitable lock 34 is adapted to be passed through the openings to lock the member 29 rigidly in place. The car may be unlocked by removing the lock 34 and withdrawing the locking member 29. In the form shown in Fig. 4, the hook not only prevents steering, but also rotation. It will be understood that a construction identical with that shown is provided for the opposite wheel (not shown).

Figure 5:
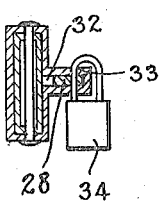
Fig. 5 is a section taken along the line 5—5 of Fig. 4, showing the lock.
Figure 6:
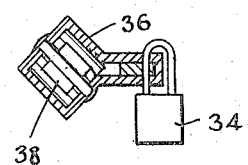
Figs. 6 and 7 are sections taken along lines corresponding to the line 5—5 of Fig. 4, showing modified forms of bumpers to which a device embodying my invention may readily be applied.
Figure 7:
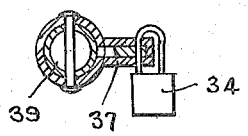

In Figs. 6 and 7 are illustrated forms of brackets 36 and 37, respectively, similar to bracket 31, but changed to conform with different cross-sections of bumpers 38 and 39, respectively. Otherwise the construction is the same as that shown in Fig. 5.

It is clear from the foregoing that numerous modifications in construction and arrangement of the locking device may be made, without departing from the spirit of the invention.

I claim:

1. A locking device comprising in combination a fixed member adapted to be secured to the frame of a vehicle between a pair of wheels, hook-shaped locking members connected with said fixed member and adapted to project between the spokes of the wheels with said hooks extending partly around the tires of said wheels, and means for locking said locking members to said fixed member.

2. A locking device for automobiles comprising in combination a fixed member adapted to be secured to the frame of an automobile between the front wheels in the manner in which a bumper is connected, hook-shaped locking members having a sliding and pivotal connection with said fixed member and adapted to be arranged to project beyond the wheels with said hooks extending partly around the tires and between the spokes, and means for locking said members rigidly to said fixed member, said locking members adapted to be folded against said fixed member when in unlocked position.

3. In a locking device for automobiles the combination with the usual front bumper, of hook-shaped locking members having slidable connections with said bumper and adapted to be extended so as to project beyond the wheels with said hooks extending around the tires and projecting between the spokes, and locks for locking said members in said extended position.

4. In a locking device for automobiles the combination with the usual front bumper of hook-shaped locking members having slidable connections with said bumpers and adapted to be extended so as to project beyond the wheels with said hooks extending around the tires and projecting between the spokes, said members and bumper having openings which register when said members are in said extended position, and locks extending through said openings and locking said members in said extended position.

In testimony whereof, I affix my signature.

HERMAN DEGEN.